(12) United States Patent
Takahashi et al.

(10) Patent No.: US 10,026,963 B2
(45) Date of Patent: Jul. 17, 2018

(54) BINDER FOR ELECTRODE OF LITHIUM SECONDARY CELL

(71) Applicant: DAI-ICHI KOGYO SEIYAKU CO., LTD., Kyoto-shi, Kyoto (JP)

(72) Inventors: Katsuo Takahashi, Kyoto (JP); Takeshi Miyamura, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 0 days.

(21) Appl. No.: 14/903,614

(22) PCT Filed: Jul. 1, 2014

(86) PCT No.: PCT/JP2014/067562
§ 371 (c)(1),
(2) Date: Jan. 8, 2016

(87) PCT Pub. No.: WO2015/008619
PCT Pub. Date: Jan. 22, 2015

(65) Prior Publication Data
US 2016/0372752 A1 Dec. 22, 2016

(30) Foreign Application Priority Data
Jul. 18, 2013 (JP) .................... 2013-149042

(51) Int. Cl.
| | |
|---|---|
| *C08G 18/08* | (2006.01) |
| *H01M 4/62* | (2006.01) |
| *C08G 18/44* | (2006.01) |
| *C08G 18/66* | (2006.01) |
| *C08G 18/72* | (2006.01) |
| *C08G 18/75* | (2006.01) |
| *C08G 18/32* | (2006.01) |
| *C08G 18/34* | (2006.01) |
| *H01M 10/0525* | (2010.01) |
| *H01M 4/13* | (2010.01) |

(52) U.S. Cl.
CPC ........ *H01M 4/622* (2013.01); *C08G 18/0823* (2013.01); *C08G 18/3206* (2013.01); *C08G 18/3215* (2013.01); *C08G 18/348* (2013.01); *C08G 18/44* (2013.01); *C08G 18/664* (2013.01); *C08G 18/6659* (2013.01); *C08G 18/6674* (2013.01); *C08G 18/6692* (2013.01); *C08G 18/722* (2013.01); *C08G 18/755* (2013.01); *C08G 18/758* (2013.01); *H01M 10/0525* (2013.01); *H01M 4/13* (2013.01)

(58) Field of Classification Search
CPC ........ H01M 4/622; H01M 4/13; C08G 18/44; C08G 18/0823; C08G 18/3206; C08G 18/3215; C08G 18/348; C08G 18/664; C08G 18/6659; C08G 18/6674; C08G 18/6692; C08G 18/722; C08G 18/755
See application file for complete search history.

(56) References Cited

U.S. PATENT DOCUMENTS

| | | | | |
|---|---|---|---|---|
| 5,043,381 | A * | 8/1991 | Coogan | C08G 18/0866 524/591 |
| 2011/0077352 | A1* | 3/2011 | Nakamura | C08G 18/0823 524/839 |
| 2013/0203936 | A1* | 8/2013 | Fujita | C09D 5/02 524/591 |

FOREIGN PATENT DOCUMENTS

| | | | |
|---|---|---|---|
| JP | 5-21068 | 1/1993 | |
| JP | 11-7948 | 1/1999 | |
| JP | 2001-210318 | 8/2001 | |
| JP | WO 2012042732 A1 * | 4/2012 | ............ C09D 5/02 |

OTHER PUBLICATIONS

International Search Report dated Sep. 30, 2014 in corresponding International Application No. PCT/JP2014/067562 (with English translation).

* cited by examiner

*Primary Examiner* — Michael L Leonard
(74) *Attorney, Agent, or Firm* — Wenderoth, Lind & Ponack, L.L.P.

(57) ABSTRACT

A binder for an electrode of a lithium secondary battery contains a polyurethane aqueous dispersion. The polyurethane aqueous dispersion contains a hydrophilic group-containing polyurethane obtained by using at least (A) an organic polyisocyanate and (B) a compound having one or more active hydrogen groups. (A) the organic polyisocyanate has a content of 50 mass % or more and 80 mass % or less based on the hydrophilic group-containing polyurethane. (B) the compound having one or more active hydrogen groups contains (B1) a compound having one or more active hydrogen groups and (B2) a compound having one or more active hydrogen groups and one or more ionic hydrophilic groups.

6 Claims, No Drawings

BINDER FOR ELECTRODE OF LITHIUM SECONDARY CELL

TECHNICAL FIELD

The present invention relates to a binder for an active material for a lithium secondary battery.

BACKGROUND ART

Recently, portable electronic devices such as a mobile phone, a notebook personal computer, a personal digital assistant (PDA), a video camera, and a digital camera are widely spread. With further requirements in size reduction and weight reduction of such electronic devices, the requirements in size reduction, weight reduction, thickness reduction, and increase of capacity of a battery as a driving power supply are rising, and investigations relating to these problems are actively proceeding. A lithium battery has high voltage and a favorable energy density, and additionally has improved safety as compared with an Ni—Cd battery and the like. For this reason, it has been widely used as a power supply of the portable electronic devices. However, with the requirement of further small-sized and weight-reduced battery along with the development of small-sized and weight-reduced display industries, further improved battery characteristics such as high drive voltage, prolonged life and high energy density as compared with a conventional lithium battery are required. Furthermore, recently, the development of a medium-sized or large-sized lithium battery for automobile use or for industries is proceeding, and expectation is placed on the development in the improvement of high capacity and high output. Therefore, to satisfy those requirements, efforts for improving the performance of various constituent elements of the lithium battery has been continued.

Characteristics of a battery are greatly influenced by an electrode, an electrolyte and other battery materials used. Particularly, in the case of an electrode, the characteristics are determined by an electrode active material, a current collector and a binder imparting adhesive force therebetween. For example, an amount and kind of the active material used determine an amount of lithium ions that can be bonded to the active material. Therefore, a higher capacity battery can be obtained as the amount of the active material is large and the active material having larger inherent capacity is used. Furthermore, in the case where the binder has an excellent adhesive force between the active materials and between the active material and the current collector, electrons and lithium ions smoothly transfer inside of the electrode, and internal resistance of the electrode is decreased. As a result, highly efficient charge and discharge can be realized. In the case of a high capacity battery, a composite electrode such as carbon and graphite or carbon and silicon is required as a negative electrode active material, and volume expansion and contraction of the active material greatly occur during charging and discharging. Therefore, the binder must have excellent elasticity in addition to excellent adhesive force, and must maintain the inherent adhesive force and restoring force despite that the electrode volume repeatedly undergoes considerable expansion and contraction.

As a binder for obtaining such the electrode, known is one containing a fluorine resin such as polytetrafluoroethylene or polyvinylidene fluoride, dissolved in an organic solvent. However, the fluorine resin does not have sufficiently high adhesiveness to a metal constituting the current collector, and additionally, does not have sufficiently high flexibility. Therefore, particularly, in the case of producing a wound-type battery, there are problems that cracks are generated in an electrode layer obtained and peeling occurs between the electrode layer obtained and a current collector. To maintain sufficient adhesive force, the input amount of the resin must be increased, and therefore size reduction has its limit. Furthermore, the resin is used as a mixture with an organic solvent, and therefore there is a disadvantage that the production becomes complicated. On the other hand, a binder containing a styrene-butadiene latex (SBR) is known as one having high adhesiveness to a metal constituting a current collector and capable of forming an electrode layer having high flexibility (Patent Documents 1, 2 and 3). SBR has excellent elastic property, but adhesive force between the electrode layer and the current collector is not sufficient, the structure of an electrode cannot be maintained with repetition of charging and discharging, and it cannot be said that a life of the battery is sufficient. Furthermore, in the case where silicon is combined with a negative electrode active material for the purpose of high capacity of the battery, the binder cannot follow volume expansion and contraction of the active material during charging and discharging, and this leads to the problem that a life of the battery is greatly decreased.

From the recent demand of high capacity of a battery, the development of a battery in which silicon alone or a composite thereof is used in a negative electrode active material has been actively conducted, and the development of a binder that can sustain bindability with respect to volume expansion and contraction of the active material during charging and discharging has been required.

PRIOR ART REFERENCES

Patent Document
Patent Document 1: JP-A-5-21068
Patent Document 2: JP-A-11-7948
Patent Document 3: JP-A-2001-210318

SUMMARY OF THE INVENTION

Problems that the Invention is to Solve

The present invention has been made based on the above circumstances, and its object is to provide a binder that can sustain, in the formation of an electrode layer in which silicon alone or a composite thereof is used in a negative electrode active material, bindability with respect to volume expansion and contraction of the active material during charging and discharging.

Means for Solving the Problems

The present inventors have made investigations to overcome the above problems in the conventional technologies, and have reached the present invention.
1) Provided is a binder for an electrode of a lithium secondary battery, containing a polyurethane aqueous dispersion, in which the polyurethane aqueous dispersion contains a hydrophilic group-containing polyurethane obtained by using at least (A) an organic polyisocyanate and (B) a compound having one or more active hydrogen groups, (A) the organic polyisocyanate has a content of 50 mass % or more and 80 mass % or less based on the hydrophilic group-containing polyurethane, and (B) the compound having one or more active hydrogen groups contains (B1) a compound having two or more active hydrogen groups and (B2) a compound having one or more active hydrogen groups and one or more ionic hydrophilic groups.

2) It is preferred that, in the polyurethane resin aqueous dispersion described in 1) above, (B1) the compound having two or more active hydrogen groups and (B2) the compound having one or more active hydrogen groups and one or more ionic hydrophilic groups have an average hydroxyl value of 300 mgKOH/g or more.

3) It is preferred that the polyurethane resin aqueous dispersion described in 1) above contains an aromatic ring structure or an alicyclic structure, and a total content ratio of the aromatic ring structure and the alicyclic structure is 40 mass % or more.

4) It is preferred that the polyurethane resin aqueous dispersion described in 1) above has an index showing a branch density in a range of from 0.3 to 1.0 per 1,000 molecular weights of the polyurethane.

5) It is preferred that, when a coating film is formed from the polyurethane resin aqueous dispersion described in 1) above and dipped in an electrolytic solution under a condition of 60° C. for 3 days, a weight increase rate of the coating film is 50% or less.

6) It is preferred that, when a coating film is formed from the polyurethane resin aqueous dispersion described in 1) above and dipped in an electrolytic solution under a condition of 60° C. for 3 days, a modulus of elasticity at 60° C. of a swollen coating film is 10 MPa or more.

7) It is preferred that, when a coating film is formed from the polyurethane resin aqueous dispersion described in 1) above, dipped in an electrolytic solution under a condition of 60° C. for 3 days and then vacuum-dried at 80° C. for 24 hours, a weight loss rate of the coating film is 10 wt % or less.

Advantageous Effects of the Invention

A coating film formed from the polyurethane resin aqueous solution of the present invention has the characteristics that the degree of swelling in an electrolytic solution is low and a high modulus of elasticity is maintained after dipping in the electrolytic solution, and an electrode using the polyurethane resin aqueous dispersion of the present invention as a binder for an electrode of a lithium secondary battery can sustain, even in the formation of an electrode layer in which silicon alone or a composite thereof is used in a negative electrode active material, bindability with respect to volume expansion and contraction of the active material.

MODE FOR CARRYING OUT THE INVENTION

The binder for an electrode of a lithium secondary battery of the present invention contains a polyurethane aqueous dispersion. The polyurethane aqueous dispersion contains a hydrophilic group-containing polyurethane obtained by using at least (A) an organic polyisocyanate and (B) a compound having one or more active hydrogen groups.

As (A) the organic polyisocyanate used in the preparation of the polyurethane resin aqueous dispersion composition of the binder for an electrode of a lithium secondary battery of the present invention, an isocyanate generally used in this technical field can be used without particular limitation. Examples thereof include an aliphatic polyisocyanate, an alicyclic polyisocyanate, an aromatic polyisocyanate, and an aromatic-aliphatic polyisocyanate.

Examples of the aliphatic polyisocyanate include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of the alicyclic polyisocyanate include isophorone diisocyanate, hydrogenated xylylene diisocyanate, 4,4'-dicyclohexylmethane diisocyanate, 2,4'-dicyclohexylmethane diisocyanate, 2,2'-dicyclohexylmethane diisocyanate, methylcyclohexylene diisocyanate, and 1,3-bis(isocyanatomethyl)cyclohexane.

Examples of the aromatic polyisocyanate include tolylene diisocyanate, 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate, and 1,4-phenylene diisocyanate.

Examples of the aromatic-aliphatic polyisocyanate include a dialkyl diphenylmethane diisocyanate, a tetraalkyl diphenylmethane diisocyanate and α,α,α,α-tetramethylxylylene diisocyanate.

Dimer, trimer and a modified product such as biuret-formed isocyanate of those organic polyisocyanates can be further exemplified. Those can be used alone or in combination of two or more thereof. From the standpoints of bindability and electrolytic solution resistance, as the organic polyisocyanate, alicyclic and/or aromatic isocyanates are preferred, and 4,4'-dicyclohexylmethane diisocyanate, isophorone diisocyanate and 1,3-bis(isocyanatomethyl)cyclohexane are particularly preferred.

To obtain the polyurethane resin aqueous dispersion composition of the binder for an electrode of a lithium secondary battery of the present invention, the content of (A) the organic polyisocyanate is preferably 50 mass % or more and 80 mass % or less, and more preferably 50 mass % or more and 75 mass % or less, based on the polyurethane in the polyurethane aqueous dispersion. When the content of the organic polyisocyanate is 50 mass % or more, electrolytic solution resistance becomes favorable, and when it is 80 mass % or less, a stable polyurethane aqueous dispersion having favorable emulsification characteristics of the polyurethane resin can be obtained.

(B) the compound having one or more active hydrogen groups in the present invention is a compound having one or more of hydroxyl groups, amino groups and mercapto groups. The active hydrogen group may be present at a molecular terminal, in the molecule or both of these.

(B) the compound having one or more active hydrogen groups includes (B1) a compound having two or more active hydrogen groups and (B2) a compound having one or more active hydrogen groups and one or more ionic hydrophilic groups.

(B1) the compound having two or more active hydrogen groups include generally known polyethers, polyesters, polyether esters, polycarbonates, polythioethers, polyacetals, polyolefins, polysiloxanes, fluorine types, and vegetable oil types. Compounds having two or more hydroxyl groups at the molecular terminal are preferred. It is preferred that the molecular weights of those compounds having two or more active hydrogen groups are in a range of from 50 to 5,000 from the standpoint of workability. Examples thereof include polyhydric alcohols such as ethylene glycol, propylene glycol, propanediol, butanediol, pentanediol, 3-methyl-1,5-pentanediol, hexanediol, neopentyl glycol, diethylene glycol, triethylene glycol, tetraethylene glycol, polyethylene glycols, dipropylene glycol, tripropylene glycol, 1,4-cyclohexanedimethanol, bisphenol A, bisphenol F, bisphenol S, hydrogenated bisphenol A, dibromobisphenol A, 1,4-cyclohexanedimethanol, dihydroxyethyl terephthalate, hydroquinone dihydroxyethyl ether, trimethylolpropane, glycerin, and pentaerythritol; their oxyalkylene derivatives; ester compounds from those polyhydric alcohols or the oxyalkylene derivatives thereof with polycarboxylic acid, polycarboxylic acid anhydrides or polycarboxylic acid esters; polyol compounds such as polycarbonate polyols, polycaprolactone polyols, polyester polyols, polythioether polyols, polyacetal polyols, polytetramethylene glycols, polybutadiene polyols, caster oil polyols, soybean oil polyols, fluorine polyols, and silicon polyol; and their modified products. Examples of the alkylene oxide include ethylene oxide, propylene oxide and butylene oxide. Those compounds having a group having two or more active hydrogen atoms may be used alone or may be used in combination of two or more thereof.

The term "ionic" in (B2) the compound having one or more active hydrogen groups and one or more ionic hydrophilic groups means an anion or a cation. Examples of the ionic hydrophilic group include a compound having a carboxyl group, a sulfonate group and its salt, and a tertiary or a quaternary ammonium salt. Of those, one having a carboxyl group is preferred from the standpoint of adhesiveness to a current collector.

Examples of the compound having a carboxyl group include carboxylic acid-containing compounds such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, and their derivatives, and their salts, and further include polyester polyols obtained by using those. Examples further include amino acids such as alanine, aminobutyric acid, aminocaproic acid, glycine, glutamic acid, aspartic acid, and histidine; and carboxylic acids such as succinic acid, adipic acid, maleic anhydride, phthalic acid, and trimellitic anhydride.

Examples of the sulfonate group-containing compound include sulfonic acid-containing compounds such as 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid, and 2,4-diaminotoluene-5-sulfonic acid, their derivatives, and polyester polyol, polyamide polyol and polyamide polyester polyol that are obtained by copolymerizing those.

By neutralization of the carboxyl group or the sulfonate group to form a salt, a polyurethane resin finally obtained can be made water-dispersible. Examples of a neutralizing agent in this case include nonvolatile bases such as sodium hydroxide and potassium hydroxide; and volatile bases such as tertiary amines such as trimethylamine, triethylamine, dimethyl ethanolamine, methyl diethanolamine, and triethanolamine, and ammonia. The neutralization can be conducted any of before an urethanation reaction, during the reaction or after the reaction.

In the case of the quaternary ammonium salt, it is introduced by the reaction with a halogenated alkyl or dialkyl sulfuric acid for quaternization, as described before. For the introduction of a cationic functional group, alkanolamine such as dimethylaminoethanol or methyldiethanolamine is first introduced. Next, in the case of introducing a neutralizing base, an organic carboxylic acid such as formic acid or acetic acid, or an inorganic acid such as hydrochloric acid or sulfuric acid is added. In the case of introducing a quaternary ammonium salt, a halogenated alkyl such as methyl chloride or methyl bromide, or a dialkyl sulfuric acid such as dimethylsulfuric acid is used as a quaternizing agent. From the standpoint of easiness of emulsification, a combination of methyl diethanolamine and an organic carboxylic acid, and a combination of methyl diethanolamine and dimethyl sulfuric acid are preferred.

As (B2) the compound having one or more active hydrogen groups and one or more ionic hydrophilic groups, the compounds described above can be used alone or can be used in combination thereof. The content of (B2) the compound having one or more active hydrogen groups and one or more ionic hydrophilic groups is preferably at least from 0.005 to 0.2 equivalents, and more preferably from 0.01 to 0.1 equivalents, per 100 parts by weight of the solid content of the polyurethane resin finally obtained. When the content falls within the range, emulsification characteristics become favorable.

A compound having one or more active hydrogen groups and one or more nonionic hydrophilic groups can be further used in addition to (B2) the compound having one or more active hydrogen groups and one or more ionic hydrophilic groups. Example thereof includes a nonionic compound containing a group having at least one active hydrogen atom in the molecule and having a repeating unit of ethylene oxide, or a group having a repeating unit of ethylene oxide and a repeating unit of other alkylene oxide. The nonionic group-containing compound is preferably a compound having a molecular weight of from 300 to 20,000, containing at least 30 wt % or more of a repeating unit of ethylene oxide and containing at least one active hydrogen in the molecule. Examples thereof include nonionic group-containing compounds such as polyoxyethylene glycol, a polyoxyethylene-polyoxypropylene copolymer glycol, a polyoxyethylene-polyoxybutylene copolymer glycol, a poloxyethylene-polyoxyalkylene copolymer glycol and their monoalkyl ether, and polyester polyether polyols obtained by copolymerization of those. In the case of using the nonionic group-containing compound, it is preferred that the compound is used in an amount of at least from 1 to 30 parts by weight, particularly from 5 to 20 parts by weight, per 100 parts by weight of the solid content of the polyurethane resin finally obtained.

To obtain the polyurethane resin aqueous dispersion composition of the polyurethane binder for an electrode of a lithium battery of the present invention, an average hydroxyl value of (B) the compound having one or more active hydrogen groups is preferably 300 mgKOH/g or more and 2,000 mgKOH/g or less, more preferably 350 mgKOH/g or more and 2,000 mgKOH/g or less, and most preferably 400 mgKOH/g or more and 2,000 mgKOH/g or less. Within the above range, electrolytic solution resistance becomes favorable.

It is also a preferred embodiment that a chain extender is used in combination as (B) the compound having one or more active hydrogen groups. A diamine or polyamine also performing a function of introducing an internal crosslinking structure is used as the chain extender. Examples of the diamines include ethylenediamine, trimethylenediamine, piperazine, isophoronediamine, xylylenediamine, 4,4'-biphenyldiamine, 4,4'-methylenedianiline, and 4,4'-oxydianiline, and examples of the polyamines include diethylenetriamine, dipropylenetriamine, and triethylenetetramine. By using the chain extender, the effects are obtained that a molecular weight of the polyurethane resin can be increased and electrolytic solution resistance of the urethane resin aqueous dispersion obtained is improved, and this is therefore preferred.

In preparing the polyurethane aqueous dispersion, a surfactant may be used to disperse the hydrophilic group-containing polyurethane. A nonionic surfactant is preferably used as the surfactant. However, when the surfactant is used, weight loss rate of a coating film when dipped in a carbonate solvent is increased. Therefore, it is preferred not to be used as possible.

It is preferred that the molecular weight of the hydrophilic group-containing polyurethane in the polyurethane aqueous dispersion is increased as possible by introducing a branch structure or an internal crosslinking structure, and it is preferred that the weight-average molecular weight is 50,000 or more. This is because when the molecular weight is increased to make solvent-insoluble, a coating film having excellent electrolytic solution resistance is obtained.

The method for producing the polyurethane aqueous dispersion is not particularly limited. Generally, a polyisocyanate stoichiometrically excessive than the total of functional groups that are contained in a polyol, a hydrophilic functional group-introducing material, a single-chain polyol, and a chain extender and that have a reactivity with an isocyanate group (equivalent ratio between the isocyanate group and the reactive functional groups is 1:0.5 to 0.98) is subjected to a reaction in absence of a solvent or in an organic solvent that does not have active hydrogen to prepare an isocyanate-terminated urethane prepolymer, and the hydrophilic functional group is then neutralized to conduct dispersion emulsification in water. Thereafter, a chain extender in an equivalent smaller than the residual isocyanate group (equivalent ratio between the isocyanate group and the chain extender is 1:0.5 to 0.95) is added and the isocyanate groups in an emulsified micelle and polyamines of the chain extender are subjected to interfacial polymerization reaction to form a urea bond. By this, a crosslinking density in the emulsified micelle is improved, and a three-dimensional crosslinking structure is formed. Thus, by the formation of the three-dimensional crosslinking structure, a coating film showing excellent electrolytic solution resistance is obtained. Thereafter, as necessary, the solvent used is removed, and the polyurethane aqueous dispersion can be obtained.

In the polyurethane aqueous dispersion of the present invention, to improve electrolytic solution resistance and modulus of elasticity at 60° C., the total of the content ratio of the aromatic ring structure and alicyclic structure in the hydrophilic group-containing polyurethane is preferably 40 mass % or more, and more preferably 43 mass % or more, in the polyurethane.

It is preferred in the polyurethane resin aqueous dispersion of the present invention that an acid value showing its carboxyl group content is 3 mgKOH/g or more. When the acid value is 3 mgKOH/g or more, dispersibility in water is favorable. The acid value was measured according to JIS K1557.

In the synthesis of the urethane prepolymer, a solvent that is inert to an isocyanate group and can dissolve the urethane prepolymer formed may be used. Examples of those solvents include dioxane, methyl ethyl ketone, dimethylformamide, tetrahydrofuran, N-methyl-2-pyrrolidone, toluene, and propylene glycol monomethyl ether acetate. It is preferred that the hydrophilic organic solvent used in the reaction is finally removed.

It is preferred that the crosslinking density of the hydrophilic group-containing polyurethane of the present invention is 0.3 or more and 1.0 or less per 1,000 molecular weights of the polyurethane resin aqueous dispersion. The crosslinking density used herein can be obtained by the calculation according to the formula shown by the Math. 1 below. That is, obtained by a calculation according to the following Math. 1 is a crosslinking density per 1,000 molecular weights of a resin solid content contained in a polyurethane aqueous dispersion obtained by the reaction of $W_{A1}$ g of an organic polyisocyanate (A) having a molecular weight of $MW_{A1}$ and the number of functional groups of $F_{A1}$, $W_{A2}$ g of an organic polyisocyanate (A) having a molecular weight of $MW_{A2}$ and the number of functional groups of $F_{A2}$, $W_{Aj}$ g of an organic polyisocyanate (A) having a molecular weight of $MW_{Aj}$ and the number of functional groups of $F_{Aj}$ (j is an integer of 1 or more), $W_{B1}$ g of a compound (B) having one or more active hydrogen groups, having a molecular weight of $MW_{B1}$ and the number of functional groups of $F_{B1}$, $W_{B2}$ g of a compound (B) having one or more active hydrogen groups, having a molecular weight of $MW_{B2}$ and the number of functional groups of $F_{B2}$, and $W_{Bk}$ g of a compound (B) having one or more active hydrogen groups, having a molecular weight of $MW_{Bk}$ and the number of functional groups of $F_{Bk}$ (k is an integer of 1 or more). When the crosslinking density is 0.3 or more, the crosslinking density is high and, as a result, electrolytic solution resistance and modulus of elasticity at 60° C. is favorable. When 1.0 or less, cracks tend not to be generated during the preparation of an electrode layer, and this makes easy to obtain an optimum electrode layer.

$$\text{Crosslinking density} = \left[ \frac{\{W_{A1}(F_{A1} - 2/MW_{A1})\} + (W_{A2}(F_{A2} - 2)/MW_{A2}) + \cdots + \{W_{Aj}(F_{Aj} - 2)/MW_{Aj}\}}{(W_{A1} + W_{A2} + \cdots + W_{Aj}) + (W_{B1} + W_{B2} + \cdots + W_{Bk})} + \frac{\{W_{B1}(F_{B1} - 2/MW_{B1})\} + (W_{B2}(F_{B2} - 2)/MW_{B2}) + \cdots + \{W_{Bj}(F_{Aj} - 2)/MW_{Bj}\}}{(W_{A1} + W_{A2} + \cdots + W_{Aj}) + (W_{B1} + W_{B2} + \cdots + W_{Bk})} \right] \times 1000$$

[Math. 1]

As a method of evaluating electrolytic solution resistance of the polyurethane aqueous dispersion of the present invention, the evaluation can be conducted by dipping a coating film formed from the polyurethane aqueous dispersion in an electrolytic solution under specific temperature condition for a specific time, and measuring weight increase rate after dipping and weight loss rate after vacuum drying the coating film after dipping.

The electrolytic solution is not particularly limited so long as it is an organic solvent used in a nonaqueous electrolytic solution of the ordinary lithium secondary batteries. Examples thereof include a carbonate compound, a lactone compound, an ether compound, a sulfolane compound, a dioxolane compound, a ketone compound, a nitrile compound, and a halogenated hydrocarbon compound. In detail, examples thereof include carbonates such as dimethyl carbonate, methyl ethyl carbonate, diethyl carbonate, ethylene carbonate, propylene carbonate, ethylene glycol dimethyl carbonate, propylene glycol dimethyl carbonate, ethylene glycol diethyl carbonate, and vinylene carbonate; lactones such as γ-butyl lactone; ethers such as dimethoxyethane, tetrahydrofuran, 2-methyl tetrahydrofuran, tetrahydropyran, and 1,4-dioxane; sulfolanes such as sulfolane and 3-methylsulfolane; dioxolanes such as 1,3-dioxolane; ketones such as 4-methyl-2-pentanone; nitriles such as acetonitrile, propionitrile, valeronitrile, and benzonitrile; halogenated hydrocarbons such as 1,2-dichloroethane; and other ionic liquids such as methyl formate, dimethyl formamide, diethyl formamide, dimethyl sulfoxide, imidazolium salt and quaternary ammonium salt. Further, the mixtures of those may be used. Among those organic solvents, when especially one or more kinds of nonaqueous solvents selected from the group consisting of the carbonates are contained, solubility of an electrolyte, dielectric constant and viscosity become excellent, and therefore this is preferred.

In the polyurethane aqueous dispersion of the present invention, the electrolytic solution resistance is that weight increase rate of a coating film that is formed from the hydrophilic group-containing polyurethane, after dipping the coating film in a mixed solvent containing 5 kinds of dimethyl carbonate, methyl ethyl carbonate, diethyl carbonate, ethylene carbonate, and propylene carbonate as a carbonate mixed solvent (composition of 1:1:1:1:1 in weight ratio) under the condition of 60° C. for 3 days is preferably 50 wt % or less, and more preferably 40 wt % or less. Furthermore, modulus of elasticity at 60° C. of a swollen coating film after dipping in the mixed solvent containing 5 kinds of dimethyl carbonate, methyl ethyl carbonate, diethyl carbonate, ethylene carbonate, and propylene carbonate as a carbonate mixed solvent (composition of 1:1:1:1:1 in weight ratio) under the condition of 60° C. for 3 days is preferably 10 MPa or more, and more preferably 100 MPa or more. The resulted value of dynamic viscoelasticity in a temperature range of from −20° C. to 150° C. measured by using Rheogel-E4000 manufactured by UBM was used as the modulus of elasticity at 60° C. of the swollen coating film.

Further, weight loss rate of a coating film after the coating film is dipped in the mixed solvent containing 5 kinds of dimethyl carbonate, methyl ethyl carbonate, diethyl carbonate, ethylene carbonate, and propylene carbonate as a carbonate mixed solvent (composition of 1:1:1:1:1 in weight ratio) under the condition of 60° C. for 3 days and then vacuum dried at 80° C. for 24 hours is preferably 10% or less, and more preferably 5% or less.

In the case where the weight increase rate of the coating film after dipping under the condition of 60° C. for 3 days exceeds 50 wt %, swelling of the coating film is increased by the electrolytic solution, the binder cannot follow the volume expansion and contraction of an active material during charging and discharging, and peeling thus occurs between the swollen electrode layer and a current corrector, leading to a problem that a life of a battery is greatly decreased. In the case where modulus of elasticity at 60° C. of the swollen coating film after dipping under the condition of 60° C. for 3 days is lower than 10 MPa, the binder cannot follow the volume expansion and contraction of an active material during charging and discharging, and peeling thus occurs between the electrode layer and the current corrector, leading to the problem that a life of a battery is greatly decreased. In the case where the weight loss rate of a coating film after the coating film is dipped under the condition of 60° C. for 3 days and then vacuum dried at 80° C. for 24 hours exceeds 10%, this means that components of the coating film have eluted in the electrolytic solution, and those components transferred to a positive electrode side through the electrolytic solution undergoes deterioration of acid value, and thus there is a concern that battery performance is deteriorated, which is not preferred.

A lithium secondary battery using the polyurethane aqueous dispersion of the present invention includes a positive electrode, a negative electrode, a separator provided between the positive electrode and the negative electrode and separating both of them, and an electrolyte layer containing a nonaqueous electrolytic solution having a lithium salt as a supporting electrolyte dissolved in a solvent for conducting lithium ions, or a polymer or polymer gel electrolyte.

The positive electrode and the negative electrode used in the lithium secondary battery using the polyurethane aqueous dispersion of the present invention include an electrode active material, a conducting agent, a current collector of the electrode active material, and a binder for binding the electrode active material and conducting agent to the current collector.

The lithium secondary battery using the polyurethane aqueous dispersion of the present invention includes an electrode produced by using the polyurethane aqueous dispersion as the binder. The polyurethane aqueous dispersion of the present invention can be used as the binder for either of the positive electrode and the negative electrode, but is preferably used as a binder for the negative electrode.

In the lithium secondary battery using the polyurethane resin aqueous dispersion of the present invention, examples of the binder for a positive electrode or a negative electrode not using the polyurethane aqueous dispersion, that can be used include polyvinylidene fluoride (PVDF); a PVDF copolymer resin such as a copolymer of PVDF with hexafluoropropylene (HFP), perfluoromethyl vinyl ether (PFMV), or tetrafluoroethylene (TFE); a fluorine resin such as polytetrafluoroethylene (PTFE) or a fluorine rubber; and a polymer such as styrene-butadiene rubber (SBR), ethylene-propylene rubber (EPDM) or styrene-acrylonitrile copolymer. However, it is not limited to those and any polymer can be used in combination so long as it can be mixed with the polyurethane aqueous dispersion.

The positive electrode active material used in the positive electrode of the lithium secondary battery using the polyurethane aqueous dispersion of the present invention is not particularly limited so long as insertion and elimination of lithium ions are possible. Examples thereof include metal oxides such as $CuO$, $Cu_2O$, $MnO_2$, $MoO_3$, $V_2O_5$, $CrO_3$, $MoO_3$, $Fe_2O_3$, $Ni_2O_3$, and $CoO_3$; complex oxides of lithium and a transition metal, such as $Li_xCoO_2$, $Li_xNiO_2$, $Li_xMn_2O_4$, and $LiFePO_4$; metal chalcogenides such as $TiS_2$, $MoS_2$ and $NbSe_3$; and conductive polymer compounds such as polyacene, polyparaphenylene, polypyrrole, and polyaniline. Of those, complex oxides of at least one selected from transition metals such as cobalt, nickel and manganese, and lithium, generally called high voltage type, are preferred from the standpoints of releasability of lithium ion and easily obtaining high voltage. Specific examples of complex oxides of cobalt, nickel or manganese, and lithium include $LiCoO_2$, $LiMnO_2$, $LiMn_2O_4$, $LiNiO_2$, $LiNi_xCo_{(1-x)}O_2$, and $LiMn_aNi_bCo_c$ (a+b+c=1).

Those lithium complex oxides having a small amount of an element such as fluorine, boron, aluminum, chromium, zirconium, molybdenum, or iron doped therein, and lithium complex oxides having a particle surface surface-treated with carbon, MgO, $Al_2O_3$, $SiO_2$, or the like can be also used. Two or more kinds of the positive electrode active materials can be also used in combination.

Conventional active materials can be used as the negative electrode active material used in the negative electrode of the lithium secondary battery using the polyurethane aqueous dispersion of the present invention without particular limitation so long as insertion and elimination of metallic lithium or lithium ion are possible. For example, use can be made of carbon materials such as natural graphite, artificial graphite, hardly graphitizable carbon, and easily graphitizable carbon. Additionally, use can be made of metal materials such as metallic lithium or its alloy, and a tin compound, lithium transition metal nitrides, crystalline metal oxides, amorphous metal oxides, silicon compounds, conductive polymers, and the like. Specific examples thereof include $Li_4TiO_{12}$, $NiSi_5C_6$, SiC, $SiO_2$, and silicon oxide powder $SiO_x$ (x is $0.5 \leq x \leq 1.5$) containing Si crystal grains.

A conducting agent is used in the positive electrode and the negative electrode of the lithium secondary battery using the polyurethane aqueous dispersion of the present invention. Electroconductive materials that do not adversely affect battery performance can be used as the conducting agent. Carbon black such as acetylene black or Ketjenblack is generally used. Conductive materials such as natural graphite (scaly graphite, flaky graphite, earthy graphite, or the like), artificial graphite, carbon whisker, carbon fiber, metal (copper, nickel, aluminum, silver, gold, or the like) powder, metal fiber, or conductive ceramic material may be used. Those can be contained as mixtures of two or more kinds thereof. The added amount is preferably from 0.1 to 30 wt %, and particularly preferably from 0.2 to 20 wt %, based on the amount of the active material.

As the current collector of the electrode active material, use can be made of any material so long as it is an electronic conductor that does not adversely affect the battery constituted. Examples of the current collector for a positive electrode include aluminum, titanium, stainless steel, nickel, baked carbon, conductive polymers, and conductive glasses. Additionally, use can be made of aluminum, copper and the like that are surface-treated with carbon, nickel, titanium, silver, or the like for the purpose of the improvement of adhesiveness, conductivity and oxidation resistance. Examples of the current collector for a negative electrode include copper, stainless steel, nickel, aluminum, titanium, baked carbon, conductive polymers, conductive glasses and, an Al—Cd alloy. Additionally, use can be made of copper and the like that are surface-treated with carbon, nickel, titanium, silver, or the like for the purpose of the improvement of adhesiveness, conductivity and oxidation resistance.

The surface of those current collector materials can also be subjected to oxidation treatment. Regarding the shape thereof, use can be made of, in addition to foil-shaped one, film-shaped, sheet-shaped, net-shaped, punched, or expanded materials, and molded products such as a lath, a porous body or a foam. The thickness thereof is not particularly limited, but one having a thickness of from 1 to 100 μm is generally used.

As the separator, use can be made of a separator used in an ordinary lithium secondary battery without particular limitation. Examples thereof include a porous resin formed by polyethylene, polypropylene, polyolefin, polytetrafluoroethylene, or the like, ceramics and non-woven fabric. The electrolytic solution may be an electrolytic solution used in an ordinary lithium secondary battery, and includes general ones such as an organic electrolytic solution and an ionic liquid.

Examples of the electrolyte salt include $LiPF_6$, $LiBF_4$, $LiClO_4$, $LiAsF_6$, LiCl, LiBr, $LiCF_3SO_3$, $LiN(CF_3SO_2)_2$, $LiC(CF_3SO_2)_3$, LiI, $LiAlCl_4$, $NaClO_4$, $NaBF_4$, and NaI, and particularly include inorganic lithium salts such as $LiPF_6$, $LiBF_4$, $LiClO_4$, and $LiAsF_6$, and organic lithium salts represented by $LiN(SO_2C_xF_{2x+1})(SO_2C_yF_{2y+1})$ in which x and y are 0 or an integer of from 1 to 4, and x+y is from 2 to 8. Examples of the organic lithium salts specifically include $LiN(SO_2F)_2$, $LiN(SO_2CF_3)(SO_2C_2F_5)$, $LiN(SO_2CF_3)(SO_2C_3F_7)$, $LiN(SO_2CF_3)(SO_2C_4F_9)$, $LiN(SO_2C_2F_5)_2$, $LiN(SO_2C_2F_5)(SO_2C_3F_7)$, and $LiN(SO_2C_2F_5)(SO_2C_4F_9)$.

Above all, when $LiPF_6$, $LiBF_4$, $LiN(CF_3SO_2)_2$, $LiN(SO_2F)_2$, $LiN(SO_2C_2F_5)_2$, or the like is used as the electrolyte, electric characteristics are excellent, and this is preferred. Of those electrolyte salts, one kind may be used or two or more kinds may be used. It is desirable that the lithium salt is contained in the electrolytic solution in a concentration of generally from 0.1 to 2.0 mol/liter, and preferably from 0.3 to 1.5 mol/liter.

An organic solvent dissolving the electrolyte salt is not particularly limited so long as it is an organic solvent used in a nonaqueous electrolytic solution of an ordinary lithium secondary battery, and examples thereof include a carbonate compound, a lactone compound, an ether compound, a sulfolane compound, a dioxolane compound, a ketone compound, a nitrile compound, and a halogenated hydrocarbon compound. In detail, the examples include carbonates such as dimethyl carbonate, methyl ethyl carbonate, diethyl carbonate, ethylene carbonate, propylene carbonate, ethylene glycol dimethyl carbonate, propylene glycol dimethyl carbonate, ethylene glycol diethyl carbonate, or vinylene carbonate; lactones such as γ-butyl lactone; ethers such as dimethoxyethane, tetrahydrofuran, 2-methyl tetrahydrofuran, tetrahydropyran, or 1,4-dioxane; sulfolanes such as sulfolane or 3-methyl sulfolane; dioxolanes such as 1,3-dioxolane; ketones such as 4-methyl-2-pentanone; nitriles such as acetonitrile, propionitrile, valeronitrile, or benzonitrile; halogenated hydrocarbons such as 1,2-dichloroethane; and other ionic liquids such as methyl formate, dimethyl formamide, diethyl formamide, dimethyl sulfoxide, imidazolium salt, and quaternary ammonium salt. Further, the mixtures of those may be used. Among those organic solvents, when especially one or more kinds of nonaqueous solvents selected from the group consisting of the carbonates are contained, solubility of an electrolyte, dielectric constant and viscosity become excellent, and therefore this is preferred.

Examples of the polymer compound used as the polymer electrolyte or the polymer gel electrolyte include polymers of ethers, esters, siloxanes, acrylonitrile, vinylidene fluoride, hexafluoropropylene, acrylate, methacrylate, styrene, vinyl acetate, vinyl chloride, oxetane or the like, polymers having their copolymer structure, and their crosslinked bodies. The polymers may be one kind or two or more kinds thereof. The polymer structure is not particularly limited, but a polymer having an ether structure, such as polyethylene oxide is particularly preferred.

In a battery container, a liquid-type battery accommodates an electrolytic solution, a gel-type battery accommodates a precursor solution obtained by dissolving a polymer in an electrolytic solution, and a solid electrolyte battery accommodates a polymer before crosslinking having an electrolyte salt dissolved therein.

To produce an electrode of the lithium secondary battery using the polyurethane resin aqueous dispersion of the present invention, a paste-like electrode material prepared by mixing the components described above may be applied to an aluminum foil, a copper foil or the like as a current collector, and a dispersion medium may be volatilized.

A thickener such as a water-soluble polymer can be used as a viscosity modifier for forming a paste of the electrode materials. Specifically, use can be made of one kind or two or more kinds selected from celluloses such as carboxymethyl cellulose (CMC), methyl cellulose, ethyl cellulose, hydroxymethyl cellulose, hydroxypropyl methyl cellulose, and hydroxyethyl methyl cellulose; polycarboxylic acid compounds such as polyacrylic acid and sodium polyacrylate; compounds having a vinyl pyrrolidone structure, such as polyvinyl pyrrolidone; polyacrylamide, polyethylene oxide, polyvinyl alcohol, sodium alginate, xanthan gum, carrageenan, guar gum, agar, starch, and the like. Of those, carboxymethyl cellulose salt is preferred. Mixing method, order and the like of each of the above-described components are not particularly limited. For example, the active material and the conducting agent can be previously mixed and used. In the mixing in such a case, a mortar, a mill mixer, a ball mill such as a planetary ball mill or a shaker-type ball mill, a mechano-fusion, or the like can be used.

The lithium secondary battery using the polyurethane aqueous dispersion of the present invention can be formed into a cylinder shape, a coin shape, a square shape or other optional shape. Basic constitution of a battery is the same regardless of the shape, and the design can be modified to be used according to the purpose. For example, a cylinder-shaped one can be obtained by winding a negative electrode obtained by applying a negative electrode active material to a negative electrode current collector and a positive electrode obtained by applying a positive electrode active material to a positive electrode current collector, with a separator interposed, storing the resulting wound body in a battery can, pouring a nonaqueous electrolytic solution thereinto, and sealing it in the state of placing an insulting plate on top and bottom. In the case of applying to a coin-shaped lithium secondary battery, a disc-shaped negative electrode, a separator, a disc-shaped positive electrode, and a stainless steel plate is stored in a laminated state in a coin-shaped battery can, a nonaqueous electrolytic solution is poured thereinto, and it is sealed.

The present invention is described in more detail by reference to Examples of a polyurethane resin aqueous dispersion, but the present invention is not construed as being limited to the following Examples.

Example 1

To a four-necked flask equipped with a stirrer, a reflux cooling pipe, a thermometer, and a nitrogen blowing pipe were added 34.0 parts by weight of KURARAY POLYOL P-520 (trade name, manufactured by Kuraray Co., Ltd., average hydroxyl value: 224 mgKOH/g, the number of active hydrogen atom: 2), 3.0 parts by weight of trimethylolpropane (the number of active hydrogen atom: 3), 4.8 parts by weight of dimethylolpropionic acid (the number of active hydrogen atom: 2), 54.2 parts by weight of dicyclohexylmethane diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 6.0%. The solution was cooled to 45° C., and 3.6 parts by weight of triethylamine was added thereto to neutralize. Thereafter, 300 parts by weight of water was gradually added to conduct emulsification dispersion by using a homogenizer. Subsequently, an amine aqueous solution obtained by diluting 4.0 parts by weight of diethylene triamine (the number of active hydrogen atom: 3) with 30 parts by weight of water was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.64).

To 20 parts by weight of the polyurethane aqueous dispersion obtained was added 20 parts by weight of ethyl cellosolve, and the resulting mixture was flow-cast on a plate finished by Teflon (registered trademark) such that a dry film thickness is about 200 μm, followed by drying at 60° C. for 4 hours, at 80° C. for 2 hours and further at 130° C. for 2 hours. Thus, a test piece was prepared. As a specific method for judging electrolytic solution resistance, tests were conducted by using a mixed solvent consisting of 5 kinds of dimethyl carbonate, methyl ethyl carbonate, diethyl carbonate, ethylene carbonate, and propylene carbonate as a carbonate mixed solvent (composition of 1:1:1:1:1 in weight ratio). Regarding electrolytic solution resistance of the polyurethane aqueous dispersion of the present invention, a coating film formed from the polyurethane aqueous dispersion was dipped in the mixed solvent under the condition of 60° C. for 3 days, and weight increase rate of the coating film thereafter was measured. Modulus of elasticity at 60° C. of a swollen coating film after dipping under the condition of 60° C. for 3 days was measured. Additionally, weight loss rate of a coating film after a coating film was dipped under the condition of 60° C. for 3 days and then vacuum dried at 80° C. under reduced pressure for 24 hours was measured.

The same evaluations were conducted in the following Example 2 to Comparative Example 4.

Example 2

To a four-necked flask equipped with a stirrer, a reflux cooling pipe, a thermometer, and a nitrogen blowing pipe were added 27.0 parts by weight of KURARAY POLYOL P-520 (trade name, manufactured by Kuraray Co., Ltd., average hydroxyl value: 224 mgKOH/g, the number of active hydrogen atom: 2), 5.2 parts by weight of trimethylolpropane (the number of active hydrogen atom: 3), 4.8 parts by weight of dimethylolpropionic acid (the number of active hydrogen atom: 2), 28.0 parts by weight of dicyclohexylmethane diisocyanate, 28.0 parts by weight of isophorone diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 7.6%. The solution was cooled to 45° C., and 3.6 parts by weight of triethylamine was added thereto to neutralize. Thereafter, 300 parts by weight of water was gradually added to conduct emulsification dispersion by using a homogenizer. Subsequently, an amine aqueous solution obtained by diluting 15.8 parts by weight of piperazine hexahydrate (the number of active hydrogen atom: 2) with 70 parts by weight of hot water was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.42).

Example 3

To a four-necked flask equipped with a stirrer, a reflux cooling pipe, a thermometer, and a nitrogen blowing pipe were added 22.4 parts by weight of ETERNACOLL UH-50 (trade name, manufactured by Ube Industries, Ltd., average hydroxyl value: 224 mgKOH/g, the number of active hydrogen atom: 2), 5.2 parts by weight of trimethylolpropane (the number of active hydrogen atom: 3), 4.8 parts by weight of dimethylolpropionic acid (the number of active hydrogen atom: 2), 60.6 parts by weight of dicyclohexylmethane diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 8.3%. The solution was cooled to 45° C., and 3.6 parts by weight of triethylamine was added thereto to neutralize. Thereafter, 300 parts by weight of water was gradually added to conduct emulsification dispersion by using a homogenizer. Subsequently, an amine aqueous solution obtained by diluting 15.8 parts by weight of piperazine hexahydrate (the number of active hydrogen atom: 2) with 70 parts by weight of hot water was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.42).

Example 4

To a four-necked flask equipped with a stirrer, a reflux cooling pipe, a thermometer, and a nitrogen blowing pipe were added 22.3 parts by weight of NEWPOL BPE-20NK (trade name, manufactured by Sanyo Chemical Industries, Ltd., ethylene oxide adduct of bisphenol A, average hydroxyl value: 360 mgKOH/g, the number of active hydrogen atom: 2), 5.0 parts by weight of trimethylolpropane (the number of active hydrogen atom: 3), 4.8 parts by weight of dimethylolpropionic acid (the number of active hydrogen atom: 2), 56.9 parts by weight of dicyclohexylmethane diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 5.8%. The solution was cooled to 45° C., and 3.6 parts by weight of triethylamine was added thereto to neutralize. Thereafter, 300 parts by weight of water was gradually added to conduct emulsification dispersion by using a homogenizer. Subsequently, an amine aqueous solution obtained by diluting 11.0 parts by weight of methylene dianiline (the number of active hydrogen atom: 2) with 70 parts by weight of methyl ethyl ketone was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.41).

Example 5

To a four-necked flask equipped with a stirrer, a reflux cooling pipe, a thermometer, and a nitrogen blowing pipe were added 9.0 parts by weight of NEWPOL BPE-20NK (trade name, manufactured by Sanyo Chemical Industries, Ltd., ethylene oxide adduct of bisphenol A, average hydroxyl value: 360 mgKOH/g, the number of active hydrogen atom: 2), 7.1 parts by weight of trimethylolpropane (the number of active hydrogen atom: 3), 4.8 parts by weight of dimethylolpropionic acid (the number of active hydrogen atom: 2), 62.7 parts by weight of dicyclohexylmethane diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 9.9%. The solution was cooled to 45° C., and 3.6 parts by weight of triethylamine was added thereto to neutralize. Thereafter, 300 parts by weight of water was gradually added to conduct emulsification dispersion by using a homogenizer. Subsequently, an amine aqueous solution obtained by diluting 16.4 parts by weight of methylene dianiline (the number of active hydrogen atom: 2) with 90 parts by weight of methyl ethyl ketone was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.56).

Example 6

To a four-necked flask equipped with a stirrer, a reflux cooling pipe, a thermometer, and a nitrogen blowing pipe were added 25.0 parts by weight of ADEKA POLYETHER BPX-11 (trade name, manufactured by ADEKA Corporation, propylene oxide adduct of bisphenol A, average hydroxyl value: 312 mgKOH/g, the number of active hydrogen atom: 2), 5.0 parts by weight of trimethylolpropane (the number of active hydrogen atom: 3), 4.8 parts by weight of dimethylolpropionic acid (the number of active hydrogen atom: 2), 58.0 parts by weight of dicyclohexylmethane diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 5.4%. The solution was cooled to 45° C., and 3.6 parts by weight of triethylamine was added thereto to neutralize. Thereafter, 300 parts by weight of water was gradually added to conduct emulsification dispersion by using a homogenizer. Subsequently, an amine aqueous solution obtained by diluting 7.2 parts by weight of xylylene diamine (the number of active hydrogen atom: 2) with 80 parts by weight of water was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.41).

Example 7

To a four-necked flask equipped with a stirrer, a reflux cooling pipe, a thermometer, and a nitrogen blowing pipe were added 6.4 parts by weight of 1,4-cyclohexane dimethanol (the number of active hydrogen atom: 2), 7.1 parts by weight of trimethylolpropane (the number of active hydrogen atom: 3), 7.8 parts by weight of dimethylolpropionic acid (the number of active hydrogen atom: 2), 72.0 parts by weight of dicyclohexylmethane diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 8.4%. The solution was cooled to 45° C., and 5.9 parts by weight of triethylamine was added thereto to neutralize. Thereafter, 300 parts by weight of water was gradually added to conduct emulsification dispersion by using a homogenizer. Subsequently, an amine aqueous solution obtained by diluting 6.7 parts by weight of ethylene diamine (the number of active hydrogen atom: 2) with 70 parts by weight of water was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.56).

Example 8

To a four-necked flask equipped with a stirrer, a reflux cooling pipe, a thermometer, and a nitrogen blowing pipe were added 6.4 parts by weight of 1,4-cyclohexane dimethanol (the number of active hydrogen atom: 2), 7.1 parts by weight of trimethylolpropane (the number of active hydrogen atom: 3), 7.8 parts by weight of dimethylolpropionic acid (the number of active hydrogen atom: 2), 72.0 parts by weight of dicyclohexylmethane diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 8.4%. The solution was cooled to 45° C., and an aqueous solution obtained by dissolving 2.3 parts by weight of sodium hydroxide in 300 parts by weight of water was gradually added to conduct emulsification dispersion by using a homogenizer. Subsequently, an amine aqueous solution obtained by diluting 6.7 parts by weight of ethylene diamine (the number of active hydrogen atom: 2) with 70 parts by weight of water was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.56).

Comparative Example 1

To a four-necked flask equipped with a stirrer, a reflux cooling pipe, a thermometer, and a nitrogen blowing pipe were added 41.0 parts by weight of ETERNACOLL UH-100 (trade name, manufactured by Ube Industries, Ltd., average hydroxyl value: 112 mgKOH/g, the number of active hydrogen atom: 2), 4.5 parts by weight of trimethylolpropane (the number of active hydrogen atom: 3), 4.8 parts by weight of dimethylolpropionic acid (the number of active hydrogen atom: 2), 46.0 parts by weight of dicyclohexylmethane diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 6.0%. The solution was cooled to 45° C., and 3.6 parts by weight of triethylamine was added thereto to neutralize. Thereafter, 300 parts by weight of water was gradually added to conduct emulsification dispersion by using a homogenizer. Subsequently, an amine aqueous solution obtained by diluting 8.3 parts by weight of piperazine hexahydrate (the number of active hydrogen atom: 2) with 40 parts by weight of hot water was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.34).

Comparative Example 2

To a four-necked flask equipped with a stirrer, a reflux cooling pipe, a thermometer, and a nitrogen blowing pipe were added 41.0 parts by weight of KURARAY POLYOL P-1020 (trade name, manufactured by Kuraray Co., Ltd., average hydroxyl value: 112 mgKOH/g, the number of active hydrogen atom: 2), 4.5 parts by weight of trimethylolpropane (the number of active hydrogen atom: 3), 4.8 parts by weight of dimethylolpropionic acid (the number of active hydrogen atom: 2), 46.0 parts by weight of dicyclohexylmethane diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 6.0%. The solution was cooled to 45° C., and 3.6 parts by weight of triethylamine was added thereto to neutralize. Thereafter, 300 parts by weight of water was gradually added to conduct emulsification dispersion by using a homogenizer. Subsequently, an amine aqueous solution obtained by diluting 8.3 parts by weight of piperazine hexahydrate (the number of active hydrogen atom: 2) with 40 parts by weight of hot water was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.34).

Comparative Example 3

To a four-necked flask equipped with a stirrer, a reflux cooling pipe, a thermometer, and a nitrogen blowing pipe were added 27.0 parts by weight of ETERNACOLL UH-50 (trade name, manufactured by Ube Industries, Ltd., average hydroxyl value: 224 mgKOH/g, the number of active hydrogen atom: 2), 5.2 parts by weight of trimethylolpropane (the number of active hydrogen atom: 3), 4.8 parts by weight of dimethylolpropionic acid (the number of active hydrogen atom: 2), 55.2 parts by weight of isophorone diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 9.1%. The solution was cooled to 45° C., and 3.6 parts by weight of triethylamine was added thereto to neutralize. Thereafter, 300 parts by weight of water was gradually added to conduct emulsification dispersion by using a homogenizer. Subsequently, an amine aqueous solution obtained by diluting 17.6 parts by weight of piperazine hexahydrate (the number of active hydrogen atom: 2) with 80 parts by weight of hot water was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.42).

Comparative Example 4

To a four-necked flask equipped with a stirrer, a reflux cooling pipe, a thermometer, and a nitrogen blowing pipe were added 34.0 parts by weight of KURARAY POLYOL P-520 (trade name, manufactured by Kuraray Co., Ltd., average hydroxyl value: 224 mgKOH/g, the number of active hydrogen atom: 2), 3.0 parts by weight of trimethylolpropane (the number of active hydrogen atom: 3), 4.8 parts by weight of dimethylolpropionic acid (the number of active hydrogen atom: 2), 54.5 parts by weight of dicyclohexylmethane diisocyanate, and 60 parts by weight of methyl ethyl ketone, and a reaction was conducted at 75° C. for 4 hours to obtain a methyl ethyl ketone solution of a urethane prepolymer, having a free isocyanate group content to a non-volatile content of 6.0%. The solution was cooled to 45° C., and 3.6 parts by weight of triethylamine was added thereto to neutralize. Thereafter, 300 parts by weight of water was gradually added to conduct emulsification dispersion by using a homogenizer. Subsequently, an amine aqueous solution obtained by diluting 3.7 parts by weight of ethylene diamine (the number of active hydrogen atom: 2) with 40 parts by weight of water was added, and a chain elongation reaction was conducted for 1 hour. The resultant was subjected to solvent removal at 50° C. under reduced pressure to obtain a polyurethane aqueous dispersion having a non-volatile content of about 30% (crosslinking density: 0.23).

The following methods were used for each measurement of the aqueous polyurethane resin compositions obtained.

[Free Isocyanate Group Content]
Measured according to JIS K 7301.

[Weight of Non-Volatile Component in Aqueous Polyurethane Resin Dispersion]
Measured according to JIS K 6828.

[Crosslinking Density in Resin Solid Content of Aqueous Polyurethane Resin Composition]
Calculated by the formula of a Math. 1.

[Content of Aromatic Ring Structure, Content of Alicyclic Structure, and Total of Content of Aromatic Ring Structure and Alicyclic Structure]
Calculated from mass % of aromatic ring structure and alicyclic structure in molecular structure constituting hydrophilic group-containing polyurethane.

[Acid Value]
Measured according to JIS K 1557.

TABLE 1

|  | Molecular weight | Ex. 1 | Ex. 2 | Ex. 3 | Ex. 4 | Ex. 5 | Ex. 6 |
|---|---|---|---|---|---|---|---|
| Polyol composition |  |  |  |  |  |  |  |
| KURARAY POLYOL P-520 | 500 | 34.00 | 27.00 |  |  |  |  |
| KURARAY POLYOL P-1020 | 1000 |  |  |  |  |  |  |
| ETERNACOLL UH-50 | 500 |  |  | 22.40 |  |  |  |
| ETERNACOLL UH-100 | 1000 |  |  |  |  |  |  |
| NEWPOL BPE-20NK | 350 |  |  |  | 22.30 | 9.00 |  |
| ADEKA POLYETHER BPX-11 | 360 |  |  |  |  |  | 25.00 |
| 1,4-Cyclohexane dimethanol | 144.21 |  |  |  |  |  |  |
| Trimethylolpropane | 134.17 | 3.00 | 5.20 | 5.20 | 5.00 | 7.10 | 5.00 |
| Dimethylolpropionic acid | 134.13 | 4.80 | 4.80 | 4.80 | 4.80 | 4.80 | 4.80 |
| Dicyclohexylmethane diisocyanate | 262 | 54.20 | 28.00 | 60.60 | 56.90 | 62.70 | 58.00 |
| Isophorone diisocyanate | 222 |  | 28.00 |  |  |  |  |
| Ethylene diamine | 60.1 |  |  |  |  |  |  |
| Diethylene triamine | 103.14 | 4.00 |  |  |  |  |  |
| Piperazine hexahydrate | 194.2 |  | 15.80 | 15.80 |  |  |  |
| Xylylene diamine | 136.2 |  |  |  |  |  | 7.20 |
| Methylene dianiline | 198 |  |  |  | 11.00 | 16.40 |  |
| Total of resins |  | 100.00 | 100.00 | 100.00 | 100.00 | 100.00 | 100.00 |
| Triethylamine |  | 3.60 | 3.60 | 3.60 | 3.60 | 3.60 | 3.60 |
| Sodium hydroxide |  |  |  |  |  |  |  |
| Content of free isocyanate group | % | 6.0 | 7.6 | 8.3 | 5.8 | 9.9 | 5.4 |
| Non-volatile content | % | 30 | 30 | 30 | 30 | 30 | 30 |
| Crosslinking density |  | 0.64 | 0.42 | 0.42 | 0.41 | 0.56 | 0.41 |
| Proportion of content of (A) organic isocyanate to hydrophilic group-containing polyurethane | wt % | 54.2 | 56.0 | 60.6 | 56.9 | 62.7 | 58.0 |
| Average hydroxyl value of (B) compound having one or more active hydrogen groups | mgKOH/g | 372 | 452 | 483 | 546 | 759 | 522 |
| Aromatic ring content | wt % | 11.8 | 9.4 | 0 | 18.1 | 16.5 | 14.6 |
| Alicyclic content | wt % | 33.9 | 34.1 | 44.6 | 35.6 | 39.3 | 36.3 |
| Total of aromatic and alicyclic contents | wt % | 45.7 | 43.5 | 44.6 | 53.7 | 55.7 | 50.9 |
| Acid value | mgKOH/g | 20.1 | 20.1 | 20.1 | 20.1 | 20.1 | 20.1 |
| Coating film properties |  |  |  |  |  |  |  |
| Electrolytic solution resistance | Weight increase rate % | 32 | 38 | 42 | 30 | 6 | 38 |
|  | Weight loss rate % | 4 | 5 | 6 | 2 | 6 | 6 |
| Modulus of elasticity at 60° C. of swollen coating film | MPa | 80 | 30 | 130 | 180 | 1170 | 620 |

|  | Molecular weight | Ex. 7 | Ex. 8 | Com. Ex. 1 | Com. Ex. 2 | Com. Ex. 3 | Com. Ex. 4 |
|---|---|---|---|---|---|---|---|
| Polyol composition |  |  |  |  |  |  |  |
| KURARAY POLYOL P-520 | 500 |  |  |  |  |  | 34.0 |
| KURARAY POLYOL P-1020 | 1000 |  |  |  | 41.0 |  |  |
| ETERNACOLL UH-50 | 500 |  |  |  |  | 27.0 |  |
| ETERNACOLL UH-100 | 1000 |  |  | 41.0 |  |  |  |
| NEWPOL BPE-20NK | 350 |  |  |  |  |  |  |
| ADEKA POLYETHER BPX-11 | 360 |  |  |  |  |  |  |

TABLE 1-continued

|  |  |  |  |  |  |  |  |
|---|---|---|---|---|---|---|---|
| 1,4-Cyclohexane dimethanol | 144.21 | 6.40 | 6.40 |  |  |  |  |
| Trimethylolpropane | 134.17 | 7.10 | 7.10 | 4.50 | 4.50 | 5.20 | 3.00 |
| Dimethylolpropionic acid | 134.13 | 7.80 | 7.80 | 4.80 | 4.80 | 4.80 | 4.80 |
| Dicyclohexylmethane diisocyanate | 262 | 72.00 | 72.00 | 46.00 | 46.00 |  | 54.50 |
| Isophorone diisocyanate | 222 |  |  |  |  | 55.20 |  |
| Ethylene diamine | 60.1 | 6.70 | 6.70 |  |  |  | 3.70 |
| Diethylene triamine | 103.14 |  |  |  |  |  |  |
| Piperazine hexahydrate | 194.2 |  |  | 8.30 | 8.30 | 17.60 |  |
| Xylylene diamine | 136.2 |  |  |  |  |  |  |
| Methylene dianiline | 198 |  |  |  |  |  |  |
| Total of resins |  | 100.00 | 100.00 | 104.60 | 100.00 | 100.00 | 100.00 |
| Triethylamine |  | 5.90 |  | 3.60 | 3.60 | 3.60 | 3.60 |
| Sodium hydroxide |  |  | 2.30 |  |  |  |  |
| Content of free isocyanate group | % | 8.4 | 8.4 | 6.0 | 6.0 | 9.1 | 6.0 |
| Non-volatile content | % | 30 | 30 | 30 | 30 | 30 | 30 |
| Crosslinking density |  | 0.56 | 0.56 | 0.34 | 0.34 | 0.42 | 0.23 |
| Proportion of content of (A) organic isocyanate to hydrophilic group-containing polyurethane | wt % | 72.0 | 72.0 | 46.0 | 46.0 | 55.2 | 54.5 |
| Average hydroxyl value of (B) compound having one or more active hydrogen groups | mgKOH/g | 961 | 961 | 287 | 287 | 452 | 372 |
| Aromatic ring content | wt % | 0 | 0 | 0 | 14.2 | 0 | 11.8 |
| Alicyclic content | wt % | 51.5 | 51.5 | 32.3 | 32.3 | 19.6 | 34.1 |
| Total of aromatic and alicyclic contents | wt % | 51.5 | 51.5 | 32.3 | 46.5 | 19.6 | 45.9 |
| Acid value | mgKOH/g | 32.6 | 32.6 | 20.1 | 20.1 | 20.1 | 20.1 |
| Coating film properties |  |  |  |  |  |  |  |
| Electrolytic solution resistance | Weight increase rate % | 18 | 6 | 108 | 53 | 75 | 58 |
|  | Weight loss rate % | 3 | 3 | 9 | 8 | 8 | 11 |
| Modulus of elasticity at 60° C. of swollen coating film | MPa | 1250 | 1400 | 0.03 | 0.7 | 0.8 | 0.3 |

In Comparative Example 1 in which ETERNACOLL UH-50 in Example 3 was replaced with ETERNACOLL UH-100, the content of an organic polyisocyanate relative to polyurethane is decreased and the content of a structure having an aromatic or an alicyclic relative to polyurethane is decreased. Therefore, weight increase rate of a coating film after dipping in a carbonate solvent under the condition of 60° C. for 3 days is increased, resulting in deterioration of electrolytic solution resistance. Additionally, modulus of elasticity at 60° C. of a swollen coating film after dipping in a carbonate solvent under the condition of 60° C. for 3 days is deteriorated.

In Comparative Example 2 in which KURARAY POLYOL P-520 in Example 2 was replaced with KURARAY POLYOL P-1020, the content of an organic polyisocyanate relative to polyurethane is decreased. Therefore, weight increase rate of a coating film after dipping in a carbonate solvent under the condition of 60° C. for 3 days is increased, resulting in deterioration of electrolytic solution resistance. Additionally, modulus of elasticity at 60° C. of a swollen coating film after dipping in a carbonate solvent under the condition of 60° C. for 3 days is deteriorated.

In Comparative Example 3 in which dicyclohexylmethane diisocyanate in Example 3 was replaced with isophorone diisocyanate, the content of a structure having an aromatic or an alicyclic relative to polyurethane is decreased. Therefore, weight increase rate of a coating film after dipping in a carbonate solvent under the condition of 60° C. for 3 days is increased, resulting in deterioration of electrolytic solution resistance. Additionally, modulus of elasticity at 60° C. of a swollen coating film after dipping in a carbonate solvent under the condition of 60° C. for 3 days is deteriorated.

In Comparative Example 4 in which diethylene triamine in Example 1 was replaced with ethylene diamine, an index showing a branch density per 1,000 resin molecular weights of polyurethane is decreased, and weight loss rate of a coating film after a coating film is dipped in a carbonate solvent under the condition of 60° C. for 3 days and then vacuum dried at 80° C. for 24 hours is increased.

INDUSTRIAL APPLICABILITY

The binder of the present invention can be used as a binder for an electrode of a lithium secondary battery, and an electrode produced by using the binder can improve charge and discharge characteristics. Therefore, it can be used in the production of various lithium secondary batteries. The lithium secondary battery obtained can be used in various portable devices such as a mobile phone, a notebook personal computer, a personal digital assistant (PDA), a video camera, and a digital camera, and in a medium-sized or large-sized lithium secondary battery for industries and for mounting in power-assisted bicycles, electric vehicles and the like.

The invention claimed is:

1. A binder for an electrode of a lithium secondary battery, comprising a polyurethane aqueous dispersion, wherein
   the polyurethane aqueous dispersion comprises a hydrophilic group-containing polyurethane obtained by using at least (A) an organic polyisocyanate and (B) a compound having one or more active hydrogen groups,
   (A) the organic polyisocyanate has a content of 54.2 mass % or more and 80 mass % or less based on the hydrophilic group-containing polyurethane, and (B) the compound having one or more active hydrogen groups comprises (B1) a compound having two or more active hydrogen groups and (B2) a compound having one or more active hydrogen groups and one or more ionic hydrophilic groups, wherein the hydrophilic group-containing polyurethane has a crosslinking density of 0.3 or more and 1.0 or less per 1,000 molecular weights of the polyurethane, and wherein the hydrophilic group-containing polyurethane comprises an aromatic ring structure or an alicyclic structure, and a total content ratio of the aromatic ring structure and the alicyclic structure is 40 mass % or more.

2. The binder for an electrode of a lithium secondary battery according to claim 1, wherein (B) the compound having one or more active hydrogen groups has an average hydroxyl value of 300 mgKOH/g or more.

3. The binder for an electrode of a lithium secondary battery according to claim 1, wherein when a coating film is formed from the hydrophilic group-containing polyurethane and dipped in an electrolytic solution under a condition of 60° C. for 3 days, a weight increase rate of the coating film is 50% or less.

4. The binder for an electrode of a lithium secondary battery according to claim 1, wherein when a coating film is formed from the hydrophilic group-containing polyurethane and dipped in an electrolytic solution under a condition of 60° C. for 3 days, a modulus of elasticity at 60° C. of a swollen coating film is 10 MPa or more.

5. The binder for an electrode of a lithium secondary battery according to claim 1, wherein when a coating film is formed from the hydrophilic group-containing polyurethane, dipped in an electrolytic solution under a condition of 60° C. for 3 days and then vacuum-dried at 80° C. for 24 hours, a weight loss rate of the coating film is 10% or less.

6. The binder for an electrode of a lithium secondary battery according to claim 1, wherein the hydrophilic group-containing polyurethane has a crosslinking density of 0.41 or more and 1.0 or less per 1,000 molecular weights of the polyurethane.

* * * * *